(12) United States Patent
Price, III et al.

(10) Patent No.: US 12,375,813 B2
(45) Date of Patent: Jul. 29, 2025

(54) INSPECTION SYSTEM AND METHOD

(71) Applicant: TE Connectivity Solutions GmbH, Schaffhausen (CH)

(72) Inventors: Edward T. Price, III, Mechanicsburg, PA (US); Anthony L. Swann, Lancaster, PA (US); Yiyun Fei, Middletown, PA (US); Shu Wang, Middletown, PA (US); Swapnilsinh Solanki, Harrisburg, PA (US); Roberto Francisco-Yi Lu, Bellvue, WA (US); Moises Gutierrez, Plymouth, MN (US); Scott Thomas Schlegel, Middletown, PA (US); Albert W. Wolfgang, III, Middletown, PA (US); Sonny O. Osunkwo, Harrisburg, PA (US); Timothy Schroeder, Plymouth, MN (US); Maxwell Wolf, Plymouth, MN (US); Breanna Hardee, Plymouth, MN (US)

(73) Assignee: TE Connectivity Solutions GmbH (CH)

( * ) Notice: Subject to any disclaimer, the term of this patent is extended or adjusted under 35 U.S.C. 154(b) by 219 days.

(21) Appl. No.: 18/170,123

(22) Filed: Feb. 16, 2023

(65) Prior Publication Data
US 2024/0284050 A1  Aug. 22, 2024

(51) Int. Cl.
*H04N 23/695* (2023.01)
*G01N 21/95* (2006.01)
*G06T 7/00* (2017.01)
*H04N 23/90* (2023.01)
*H04N 23/56* (2023.01)

(52) U.S. Cl.
CPC .......... *H04N 23/695* (2023.01); *G01N 21/95* (2013.01); *G06T 7/0004* (2013.01); *H04N 23/90* (2023.01); *G01N 2201/021* (2013.01); *H04N 23/56* (2023.01)

(58) Field of Classification Search
CPC ... F16L 55/26; G02B 21/0028; G02B 21/006; G02B 21/0064; G02B 21/0072; G02B 21/0076; G02B 21/0084; G02B 23/24; G02B 23/2484; G06F 18/2411; G06N 20/10; H04N 1/00095
USPC .......................................................... 348/92
See application file for complete search history.

(56) References Cited

U.S. PATENT DOCUMENTS

2020/0172381 A1* 6/2020 Liu ...................... G01N 21/952

FOREIGN PATENT DOCUMENTS

KR        2011054422 A  *  5/2011

* cited by examiner

*Primary Examiner* — Masum Billah

(57) ABSTRACT

An inspection system for inspecting an elongated product includes a platform having a rail, a product holder assembly having product grippers for holding the elongated product, and a vision system for inspecting the product. The vision system includes a carrier coupled to the rail and movable along the rail, a camera support coupled to the carrier and holding cameras configured to image the elongated product from different angles. The cameras move along an entire length of the elongated product to image the entire elongated product between a first end and a second end of the elongated product.

20 Claims, 9 Drawing Sheets

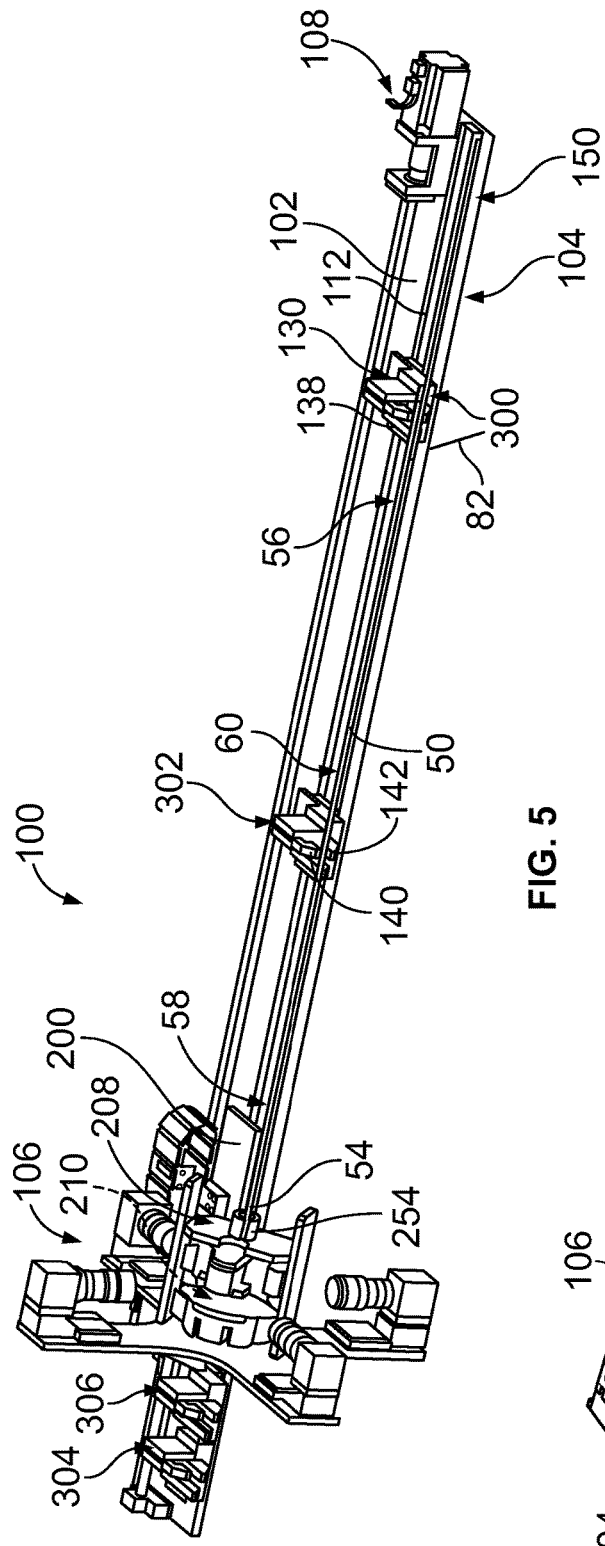
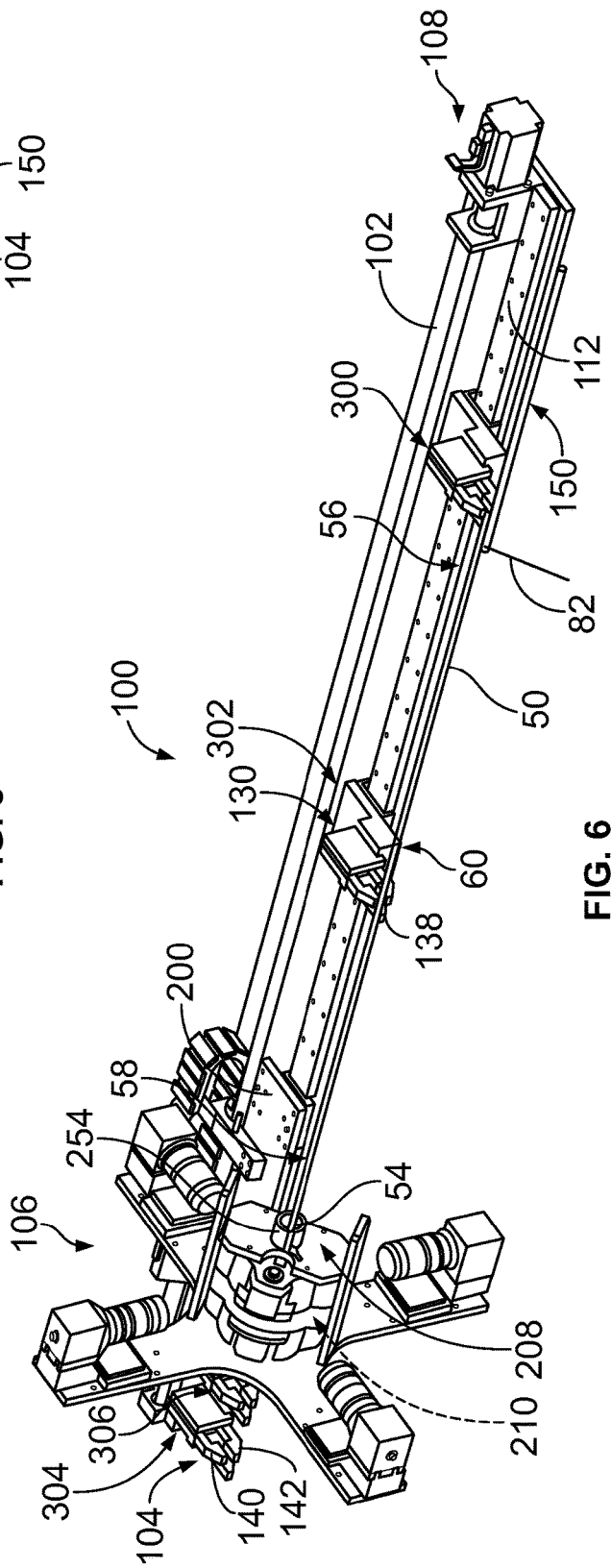

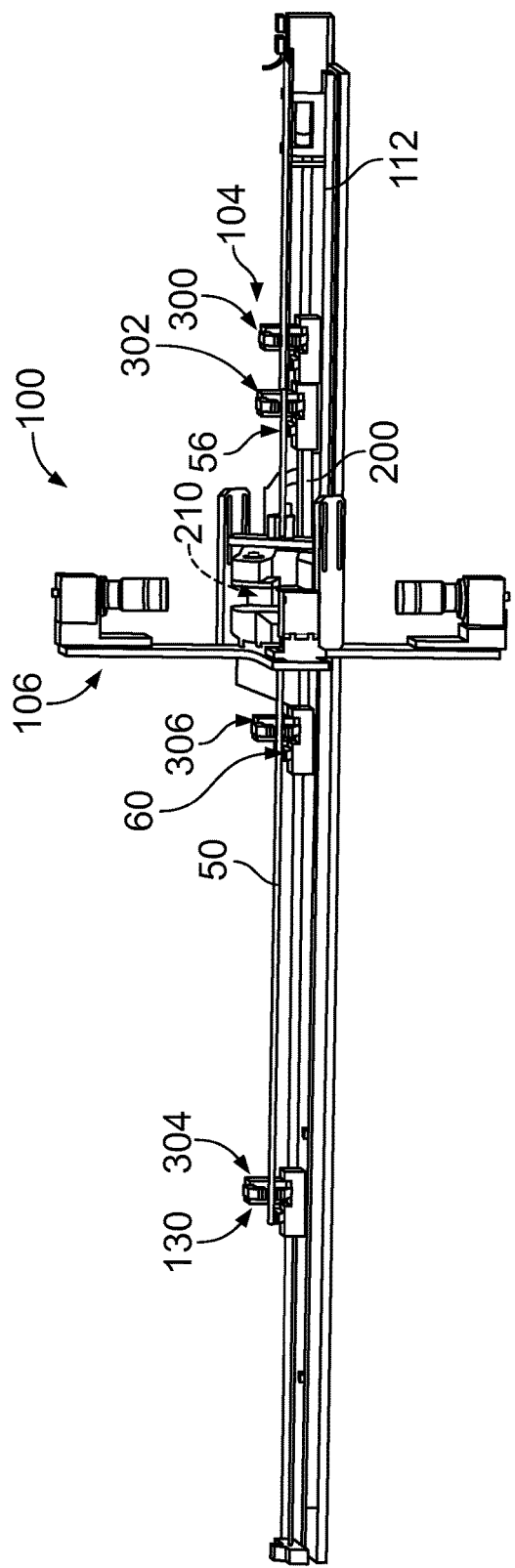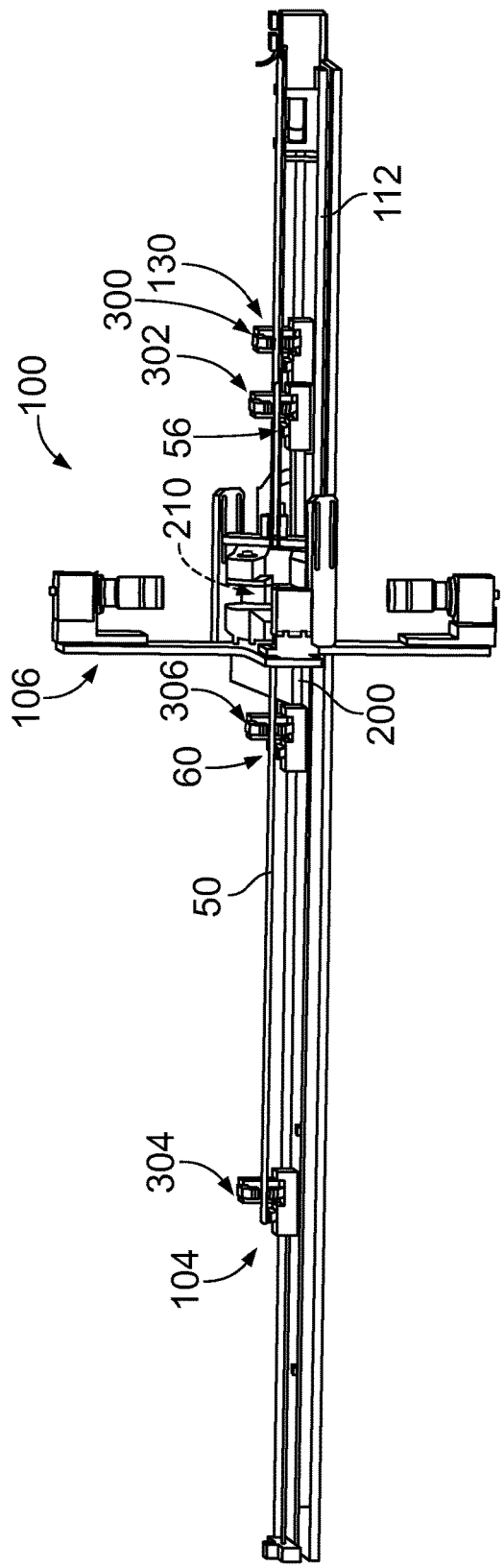
FIG. 9
FIG. 10

INSPECTION SYSTEM AND METHOD

BACKGROUND OF THE INVENTION

The subject matter herein relates generally to inspection systems and methods.

Inspection systems are used to inspect various types of products. Some products are difficult to inspect due to their size, shape, or material. Catheters are a type of common product in medical industries in need of inspection. Inspection of catheters is typically performed by human operators using magnifiers and microscopes because automated inspection is difficult due to the shape, size, and material of the catheter. Due to the nature of the part and the subjectiveness of inspection criteria, automated inspection of catheters is a challenging problem in the medical industry. Current catheter inspection processes is a manual process where human operators use magnification to assist them in finding defects if any. As a result of defect size and defect colors like the catheter background, operators will miss defects or misclassify them. After several hours of inspection, human operators can become tired and influence the inspection accuracy.

A need exists for an automated inspection system for certain catheters.

BRIEF DESCRIPTION OF THE INVENTION

In one embodiment, an inspection system for inspecting a linear, elongated product is provided and includes a platform having a rail. The inspection system includes a product holder assembly for holding the elongated product and further includes a plurality of product grippers. Product grippers can be positioned in two ways (open and closed) and are specifically configured to hold the elongated product in the closed position. The inspection system includes a vision system for inspecting the product and includes a carrier coupled to a rail; the carrier is movable along the rail. The carrier includes a camera support and moves along the rail with the carrier. The vision system consists of a plurality of cameras attached to the camera support and enables the cameras to image the catheter from different angles. The cameras move along the entire length of the elongated product to image the entire surface of the unit from end to end.

In another embodiment, an inspection system for inspecting a linear, elongated product is provided and includes a platform having a rail. The inspection system includes a product holder assembly for holding the elongated product. The product holder includes a plurality of product grippers. Product grippers can be positioned in two ways (open and closed) and are specifically configured to hold the elongated product in the closed position. The inspection system includes a vision system for inspecting the product and includes a carrier coupled to the rail; the carrier is movable along the rail. The carrier includes a camera and moves along the rail with the carrier. The vision system includes a plurality of cameras attached to the camera support and enables the cameras to image the catheter from different angles. The vision system is movable between a first position, a second position, and a third position. The vision system imaging a first (distal) end of the elongated product at the first position. The vision system imaging a middle portion of the elongated product in the second position. The vision system imaging a second (proximal) end of the elongated product in the third position. Different combinations of the product grippers hold the elongated product in each of the first position, the second position, and the third position.

In a further embodiment, a method of inspecting elongated parts is provided. The method holds the elongated product using product grippers of a product holder assembly. Each product gripper is movable between an open position and a closed position. The product gripper is configured to hold the elongated product in the closed position. The method images the elongated product using a plurality of cameras of a vision system and the cameras image the elongated product from different angles. The method moves the plurality of cameras along the elongated product to image an entire length of the elongated product between a first (distal) end and a second (proximal) end of the elongated product. The method processes the images to identify defects in the elongated product.

BRIEF DESCRIPTION OF THE DRAWINGS

FIG. 5 is a front perspective view of the inspection system in accordance with an exemplary embodiment showing the elongated product initially loaded into the inspection system.

FIG. 6 is a front perspective view of the inspection system in accordance with an exemplary embodiment showing the product holder assembly activated to secure the elongated product in the inspection system.

FIG. 9 is a side view of the inspection system in accordance with an exemplary embodiment showing the vision system in a third position.

FIG. 10 is a side view of the inspection system in accordance with an exemplary embodiment showing the vision system in the third position after the product holder assembly is activated to change the product grippers that are holding the elongated product.

DETAILED DESCRIPTION OF THE INVENTION

Figure 1:
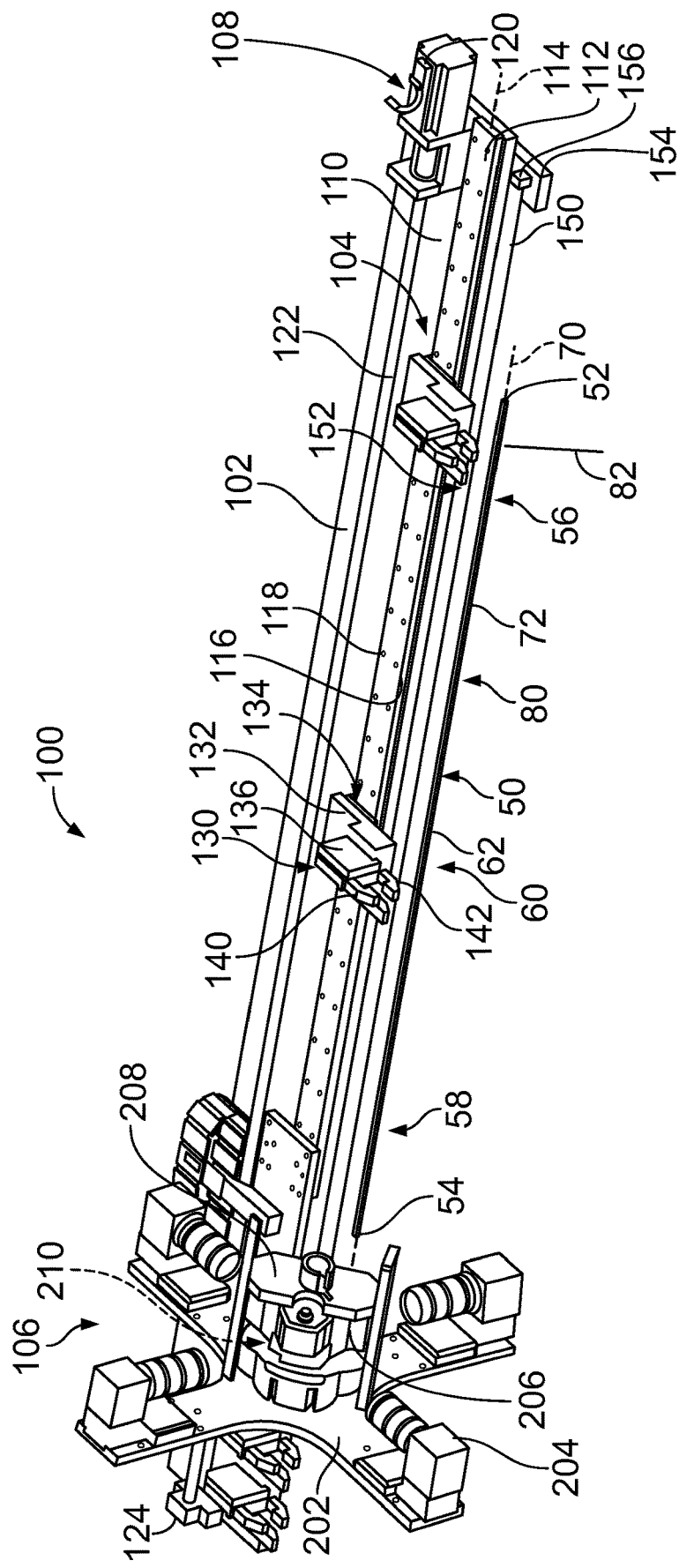
FIG. 1 is a front perspective view of an inspection system in accordance with an exemplary embodiment.

FIG. 1 is a front perspective view of an inspection system 100 in accordance with an exemplary embodiment. The inspection system 100 is used to inspect an elongated product 50 for defects. In an exemplary embodiment, the inspection system 100 is a vision inspection system using imaging devices to image the elongated product 50 and processors to process the images for defects. The inspection system 100 is an automated inspection system using computers to identify defects in the elongated product 50. In various embodiments, the inspection system 100 may present images to a human operator identifying defects and displaying part result (acceptable or not acceptable).

In an exemplary embodiment, the inspection system 100 inspects the entire length of the elongated product 50. For example, the inspection system 100 inspects the elongated product 50 from a first end 52 to a second end 54. The inspection system 100 inspects a first end portion 56, a second end portion 58, and a middle portion 60 between the first and second and portions 56, 58. The middle portion 60 includes a center 62 of the elongated product 50. Optionally, the middle portion 60 may include approximately the middle 50% of the elongated product 50 centered about the center 62 of the elongated product 50. The first end portion 56 includes approximately the first 25% of the elongated product 50 and the second end portion 58 includes approximately the last 25% of the elongated product 50. The inspection system 100 inspects the entire circumference of the elongated product 50 along the length of the elongated product 50.

In an exemplary embodiment, the elongated product 50 is linear extending along an axis 70. In various embodiments, the elongated product 50 has a length at least 50× longer than the width of the elongated product 50. In an example, the elongated product 50 may be approximately 46 inches long and have an outer diameter of approximately 0.02 inch. In some embodiments, the elongated product 50 has a length at least 100× longer than the width of the elongated product 50. In an exemplary embodiment, the elongated product 50 is tubular and might be manufactured from a polymer material, such as polyvinyl chloride (PVC), silicone, polytetrafluoroethylene (PTFE), and others. In various embodiments, the elongated product 50 is firm but pliable to allow the elongated product 50 to retain its general shape while also allowing the elongated product 50 to be flexible when in use. The elongated product 50 may be tubular having a hollow interior. Other components may be received in the interior of the elongated product 50 such as signal wires, guide wire, or other medical devices such as a syringe or scalpel. In various embodiments, the elongated product 50 may have a jacket or coating 72 on the exterior of the elongated product 50, which may be inspected by the inspection system 100. For example, the jacket 72 may be a PTFE material, a polyether block amide (PEBA) material, a carboxylic acid polyamide with an alcohol termination polyether (PEG), and the like.

In an exemplary embodiment, the elongated product 50 is a catheter 80 used in medical applications that is tubular and hollow. In an exemplary embodiment, the catheter 80 includes a guide wire 82 extending along the length of the catheter 80, which exits the catheter at or near one end of the catheter 80.

The inspection system 100 is used to identify defects in the elongated product 50. Various types of defects may be identified by the inspection system 100 including foreign material, exposed wires, voids, scratches, air bubbles, and others. The inspection system 100 may be capable of identifying small defects as small as 0.02 mm$^2$.

The inspection system 100 includes a platform 102 supporting a product holder assembly 104, a vision system 106, and a feeder assembly 108. The product holder assembly 104 is used to hold the elongated product 50 during the inspection process. The vision system 106 is used to inspect the elongated product 50 during the inspection process. The feeder assembly 108 is used to move the vision system 106 relative to the elongated product 50 during the inspection process.

In an exemplary embodiment, the platform 102 is a planar structure such as a metal plate which supports the various components of the inspection system 100. The platform 102 may rest on a tabletop, bench, frame, or other support structure. For example, the components may be mounted to an upper surface 110 of the platform 102. In an exemplary embodiment, a rail 112 is mounted to the upper surface 110. The vision system 106 is mounted to the rail 112 and is movable along the rail 112. In various embodiments, components of the product holder assembly 104 may be mounted to the rail 112 and movable along the rail 112. The rail 112 extends along an axis 114. The rail 112 is a first side 116 and a second side 118 opposite the first side 116. The sides 116, 118 extend parallel to the axis 114. The rails 112 guides movement of the components of the inspection system 100. For example, the components may slide along the first side 116 and/or the second side 118.

In an exemplary embodiment, the feeder assembly 108 includes an actuator 120 and a shaft 122 operably coupled to the actuator 120. The shaft 122 is coupled to the vision system 106 to move the vision system 106. In an exemplary embodiment, the shaft 122 is a threaded shaft. The actuator 120 is used to rotate the shaft 122. The rotation of the shaft 122 causes the vision system 106 to move relative to the platform 102 and the elongated product 50. The actuator 120 may be an electric motor having a driveshaft coupled to the shaft 122. Electric motor rotates the driveshaft to rotate the shaft 122. Other types of actuators may be used in alternative embodiments such as a hydraulic actuator, a pneumatic actuator, or another type of actuator. Other types of shafts may be used in alternative embodiments such as a pull rod, a push rod, a linkage such as a chain or poorly, or other types of drives elements used to move the vision system 106. A distal end of the shaft 122 may be coupled to a shaft support 124 coupled to the platform 102. The shaft support 124 may include a theory or other type of support element.

The product holder assembly 104 includes a plurality of product grippers 130 used to hold the elongated product 50 during the inspection process. The product grippers 130 may be spaced apart along the platform 102. In various embodiments, the product grippers 130 are movable relative to the platform 102. For example, the product grippers 130 may be slidably coupled to the rail 112 and movable along the rail 112. In the illustrated embodiment, each product gripper 130 includes a carriage 132 having a track 134 coupled to the rail 112. The carriage 132 is slidable along the rail 112.

The product gripper 130 includes a mount 136 mounted to the carriage 132. The mount 136 supports an upper jaw 140 and a lower jaw 142. The upper jaw 140 and/or the lower jaw 142 is movable relative to the mount 136. For example, the upper jaw 140 and/or the lower jaw 142 may be closed and opened to grip and release the elongated product 50. In an exemplary embodiment, the product gripper 130 is movable between an open position and a closed position. The upper jaw 140 and/or the lower jaw 142 are moved relatively closer to each other in the closed position and moved relatively further from each other in the open position.

The elongated product 50 is received in the space between the upper jaw 140 and the lower jaw 142. When the product gripper 130 is closed, the product gripper 130 securely holds the elongated product 50. The product gripper 130 may be electrically actuated, hydraulically actuated, pneumatically actuated, magnetically actuated, or otherwise movable between the open position in the closed position.

In an exemplary embodiment, the product holder assembly 104 includes a guide wire holder 150 used to hold the guide wire 82. In various embodiments, the guide wire holder 150 includes a slot or notch 152 that receives the guide wire 82. The guide wire holder 150 extends along the platform 102. The guide wire holder 150 may be coupled to the platform 102 such as using a mounting bracket 154. In various embodiments, the guide wire holder 150 may be movable relative to the platform 102. For example, the guide wire holder 150 may be coupled to the mounting bracket 154 by a spring 156. The guide wire holder 150 may move the guide wire 82 out of the inspection view area during the inspection process. Removing the guide wire 82 allows the vision system 106 to inspect the elongated product 50 without interference or blocking by the guide wire 82.

The vision system 106 is used to image the elongated product 50 during the inspection process. In an exemplary embodiment, the vision system 106 includes a carrier 200, a camera support 202, a plurality of cameras 204, a lighting device 206, and a product guide 208. The carrier 200 is coupled to the rail 112 and movable relative to the platform 102 along the rail 112. The feeder assembly 108 is coupled to the carrier 200 and moves the carrier 200 along the rail 112. The camera support 202 extends from the carrier 200 and supports the cameras 204, the lighting device 206, and the product guide 208. The cameras 204 are arranged around an imaging zone 210 to image the elongated product 50. The product guide 208 positions the elongated product 50 in the imaging zone 210. To provide lighting for elongated product 50 in imaging zone 210, the lighting device 206 surrounds the imaging zone 210.

Figure 2:
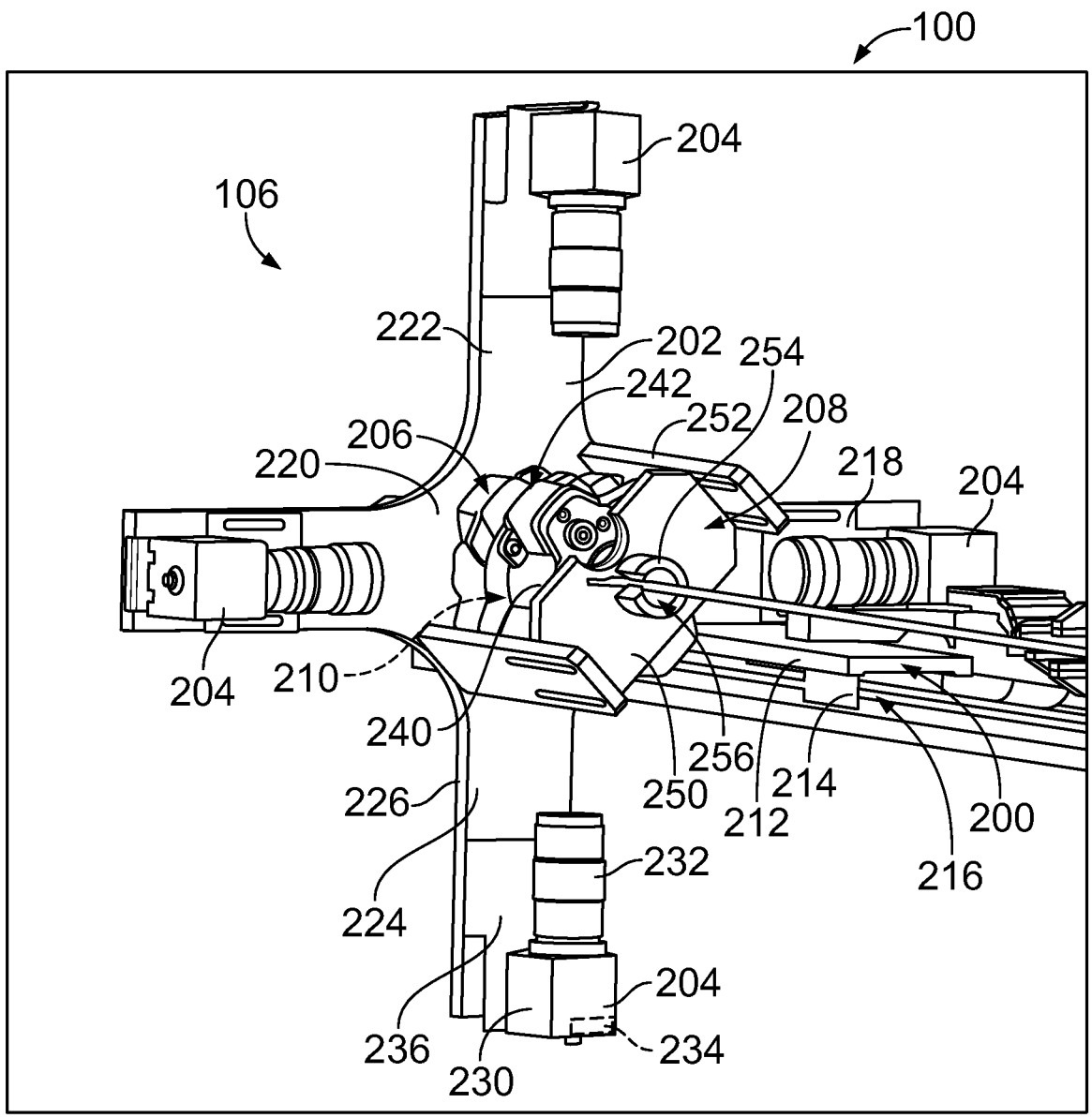
FIG. 2 is a front perspective view of a portion of the inspection system showing the vision system in accordance with an exemplary embodiment.

FIG. 2 is a front perspective view of a portion of the inspection system 100 showing the vision system 106 in accordance with an exemplary embodiment. FIG. 2 also shows the carrier 200, the camera support 202, the cameras 204, the lighting device 206, and the product guide 208.

The carrier 200 includes a plate 212 and one or more slides 214 extending from the plate 212. The slides 214 include a track 216 that receives the rail 112. The slides 214 may include wheels, rollers, bearings, or other elements to reduce friction and enhance sliding along the rail 112. In an exemplary embodiment, a bracket 218 extends from the plate 212. The bracket 218 is coupled to the camera support 202 to secure the camera support 202 to the carrier 200.

In an exemplary embodiment, the camera support 202 includes a hub 220 and arms 222 extending from the hub 220. The camera support 202 includes a front 224 and a rear 226. In an exemplary embodiment, the center of the hub 220 includes an opening (not shown) that receives the elongated product 50. The elongated product 50 passes through the opening as the vision system 106 moves along and inspects the elongated product 50. The lighting device 206 is coupled to the hub 220 forward of the camera support 202. The lighting device 206 surrounds the opening in the hub 220.

In the illustrated embodiment, four perpendicular arms 222 extend from the hub 220. Greater or fewer arms 222 may be provided in alternative embodiments. Each arm 222 supports the corresponding camera 204. One of the arms 222 is coupled to the bracket 218. In the illustrated embodiment, two of the arms 222 extend horizontally and the other two arms 222 extend vertically. The arms 222 may extend in other directions in alternative embodiments. In the illustrated embodiment, the cameras 204 are mounted to the front 224 of the arms 222.

The cameras 204 are positioned around the outside of the imaging zone 210. The cameras 204 are aimed at the imaging zone 210 to image the elongated product 50 in the imaging zone 210. The cameras 204 are configured to image the elongated product 50 from different sides. For example, in the illustrated embodiment, the cameras 204 image the elongated product 50 from a top side, bottom side, right side, and left side of the imaging zone 210. Each camera 204 is configured to image at least 90° of the circumference of the elongated product 50. As such, the cameras 204 are configured to image 360° of the elongated product 50. In an exemplary embodiment, each camera 204 images greater than 90° of the circumference and portions of the images are overlapping. Greater or fewer cameras 204 may be provided in alternative embodiments.

In an exemplary embodiment, each camera 204 includes an imaging device 230, a lens 232, and a processor 234. The imaging device 230 takes images of the elongated product 50 and the processor 234 processes the images. The lens 232 is used to focus the images at the imaging zone 210 and may be used to zoom and/or focus the image. In an exemplary embodiment, each camera 204 is mounted to the camera support 202 using a camera mounting bracket 236. The camera mounting bracket 236 may be adjustable relative to the corresponding arm 222 and/or the camera 204 may be adjustable on the camera mounting bracket 236.

The lighting device 206 is provided at the imaging zone 210. In an exemplary embodiment, the lighting device 206 includes one or more ring lights 240 which provide circumferential lighting around the imaging zone 210. In an exemplary embodiment, a gap 242 is provided between the ring lights 240. The cameras 204 are aligned with the gap 242 to view the elongated product 50 passing through the gap 242. The lighting effect provided by the lighting device 206 may be controlled through light intensity and/or the light color and/or the lighting direction.

In an exemplary embodiment, the product guide 208 is coupled to the camera support 202 and located forward of the lighting device 206. The product guide 208 includes a central plate 250 and support walls 252 supporting the central plate 250. The support walls 252 may be mounted to the hub 220 of the camera support 202. The support walls 252 may also support the lighting device 206. In an exemplary embodiment, the product guide 208 includes a funnel 254 having a central bore 256. The funnel 254 guides the elongated product 50 into the central bore 256. The central bore 256 is aligned with the lighting device 206 in the opening in the center of the hub 220. The funnel 254 positions the elongated product 50 in the imaging zone 210. The cameras 204 surrounds the central bore 256 to image the elongated product 50 as the elongated product 50 passes through the funnel 254 into the central bore 256.

Figure 3:
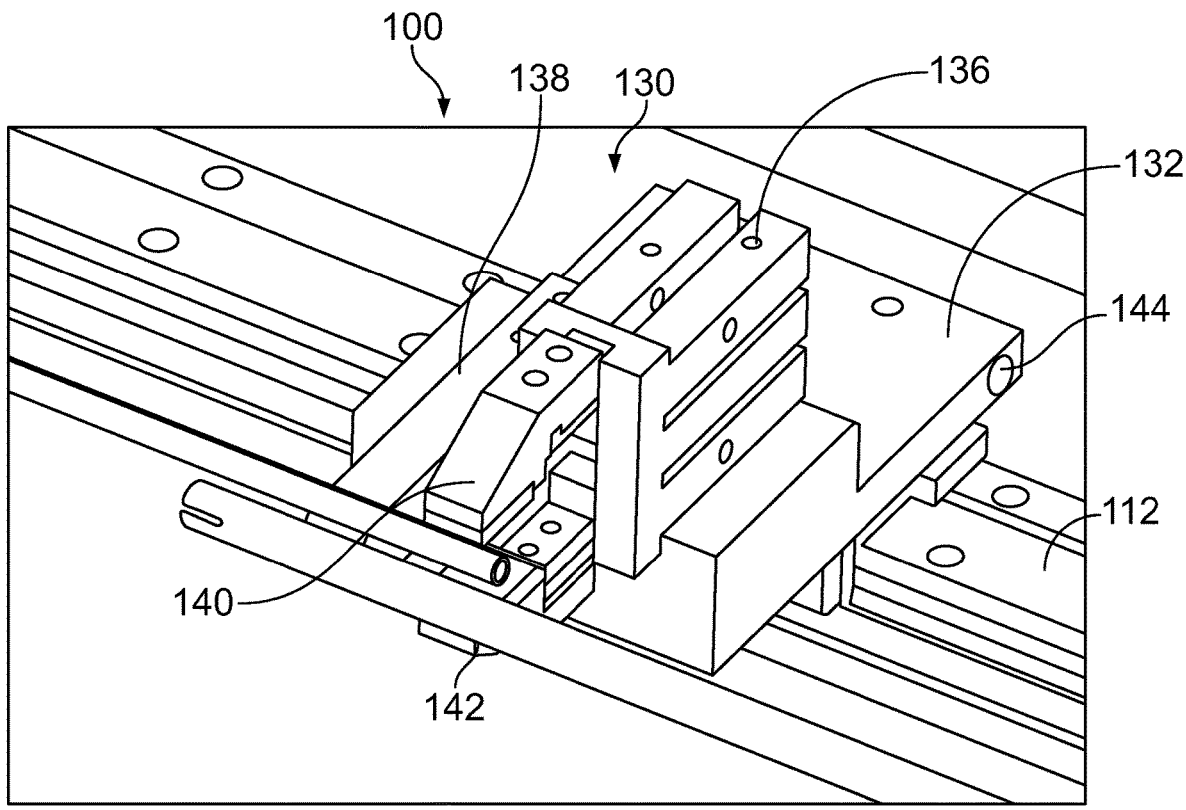
FIG. 3 is a front perspective view of a portion of the inspection system showing one of the product grippers in accordance with an exemplary embodiment.
Figure 4:
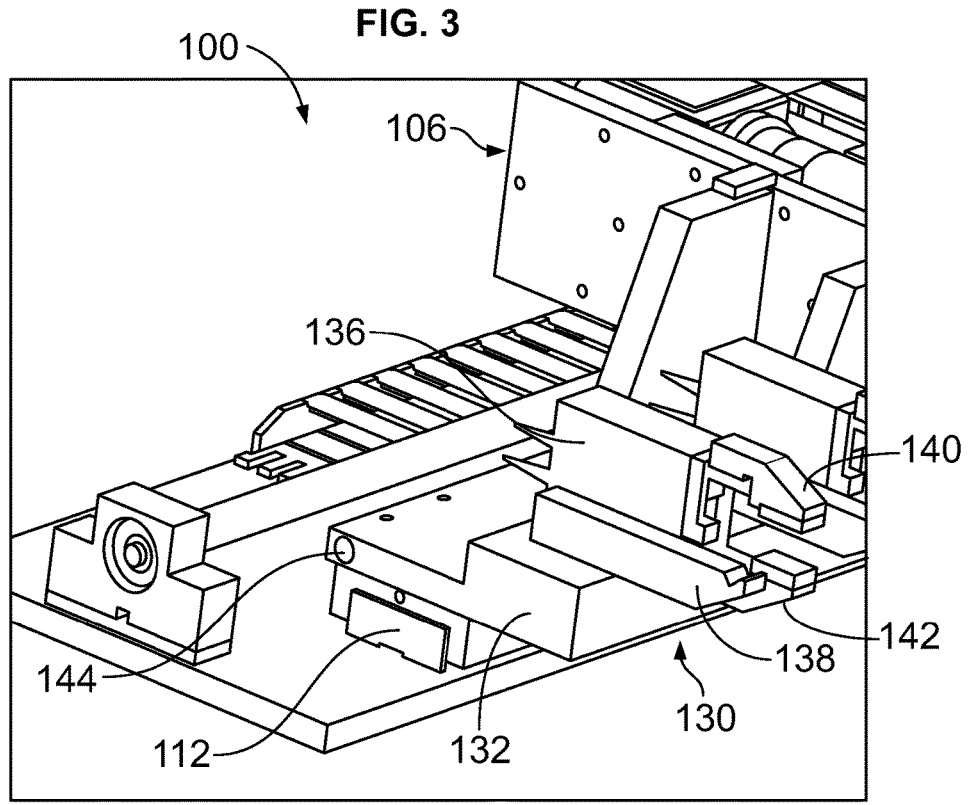
FIG. 4 is a rear perspective view of a portion of the inspection system showing one of the product grippers in accordance with an exemplary embodiment.

FIG. 3 is a front perspective view of a portion of the inspection system 100 showing one of the product grippers 130 in accordance with an exemplary embodiment. FIG. 4 is a rear perspective view of a portion of the inspection system 100 showing one of the product grippers 130 in accordance with an exemplary embodiment. The product grippers 130 are used to hold the elongated product 50 during the inspection process.

The product grippers 130 are slidably coupled to the rail 112 and movable along the rail 112. The carriage 132 is coupled to the rail 112 and slidable along the rail 112. In an exemplary embodiment, the product gripper 130 includes a product support 138 mounted to the carriage 132, such as adjacent to the mount 136. The product support 138 includes a pocket that receives the elongated product 50. The pocket may be V-shaped or U-shaped to receive the elongated product 50. The product support 138 supports the elongated product 50 adjacent to the upper jaws 140 and lower jaws 142. When the carriage 132 moves along the rail 112 during operation, the product support 138 slides along the elongated product 50. The product support 138 supports the elongated product 50 at a position such that the elongated product 50 is located in the space between the upper jaw 140 and lower jaw 142. The upper jaw 140 and/or the lower jaw 142 may be closed and opened to grip and release the elongated product 50. When the product gripper 130 is closed, the product gripper 130 securely holds the elongated product 50.

In an exemplary embodiment, the carriage 132 includes securing elements 144 at the sides of the carriage 132. The securing elements 144 are used to couple the carriage 132 to another carriage 132 or the carrier 160 of the vision system 106 to move the carriage 132 along the rail 112. In various embodiments, the securing elements 144 are magnets that couple the carriage 132 to another carrier 160. Other types of securing elements, such as clips, latches, fasteners, and the like, may be used in alternative embodiments to secure the carriage 132 to the other carrier 160 to facilitate moving the product grippers 130 along the rail 112.

FIG. 5 is a front perspective view of the inspection system 100 in accordance with an exemplary embodiment showing the elongated product 50 initially loaded into the inspection system 100. FIG. 6 is a front perspective view of the inspection system 100 in accordance with an exemplary embodiment showing the product holder assembly 104 activated securing the elongated product 50 in the inspection system 100.

In an exemplary embodiment, the product holder assembly 104 includes four product grippers 130 with two located forward of the vision system 106 and two located rearward of the vision system 106. For example, the product holder assembly 104 includes a first forward product gripper 300 and a second forward product gripper 302 forward of the vision system 106. The product holder assembly 104 includes a first rearward product gripper 304 and a second rearward product gripper 306 rearward of the vision system 106. The first forward product gripper 300 is located forward of the second forward product gripper 302. The first rearward product gripper 304 is located rearward of the second rearward product gripper 306. In an exemplary embodiment, different combinations of the product grippers 300, 302, 304, 306 are used to hold the elongated product 50 at different times during the inspection process. For example, the product grippers 300, 302, 304, 306 may be independently closed and opened to grip and release the elongated product 50 during the inspection process. In an exemplary embodiment, at least two of the product grippers 300, 302, 304, 306 are closed and holding the elongated product 50 at any given time during the inspection process.

At the start of the inspection process, the vision system 106 is moved by the feeder assembly 108 to a rearward starting position (first position shown in FIG. 5). For example, the first and second rearward product grippers 304, 306 and the carrier 200 of the vision system 106 are moved to the rearward end of the rail 112. The first and second forward product grippers 300, 302 are located forward of and spaced apart from the carrier 200 of the vision system 106. The first forward product gripper 300 is spaced apart from the second forward product gripper 302.

At the start of the inspection process (FIG. 5), the product grippers 300, 302, 304, 306 are in the open position. The elongated product 50 is initially loaded into the inspection system 100 by placing the elongated product 50 in the product support 138. For example, the first end portion 56 of the elongated product 50 may be loaded into the product support 138 of the first forward product gripper 300 and the middle portion 60 of the elongated product 50 may be loaded into the product support 138 of the second forward product gripper 302. The second end 54 of the elongated product 50 is loaded into the funnel 254 of the product guide 208. The product guide 208 that supports the second end portion 58 of the elongated product 50. When initially loaded, the second end 54 of the elongated product 50 is located forward of the imaging zone 210. In an exemplary embodiment, the guide wire 82, which extends from the first and 52, is coupled to the guide wire holder 150.

After the elongated product 50 is loosely positioned in the inspection system 100, the product holder assembly 104 is operated to move the first forward product gripper 300 and the second forward product gripper 302 to the closed position. The upper jaws 140 and/or the lower jaws 142 are closed to clamp the elongated product 50 in the first and second forward product grippers 300, 302. In the initial position, the first and second rearward product grippers 304, 306 are located rearward of the elongated product 50 and thus remain in the open positions to allow positioning of the first and second rearward product grippers 304, 306 on the elongated product 50 during the inspection process.

After the elongated product 50 is securely held in the inspection system 100, the vision system 106 may begin imaging the elongated product 50 in the imaging zone 210. Once imaging is initiated, the vision system 106 may begin moving in a forward direction along the elongated product 50. The first and second forward product grippers 300, 302 remain stationary as the vision system 106 begins moving in the forward direction. The first and second forward product grippers 300, 302 hold the elongated product 50 in a fixed position relative to the platform 102 as the vision system 106 begins to move forward relative to the platform 102.

Figure 7:
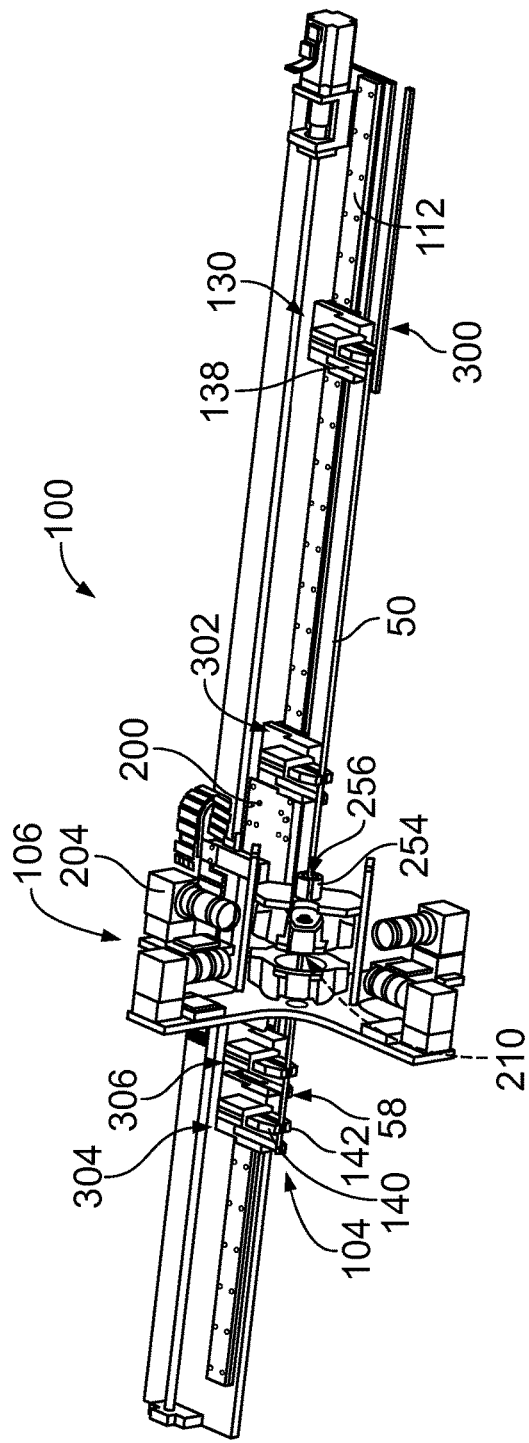
FIG. 7 is a front perspective view of the inspection system in accordance with an exemplary embodiment showing the vision system in a second position.
Figure 8:
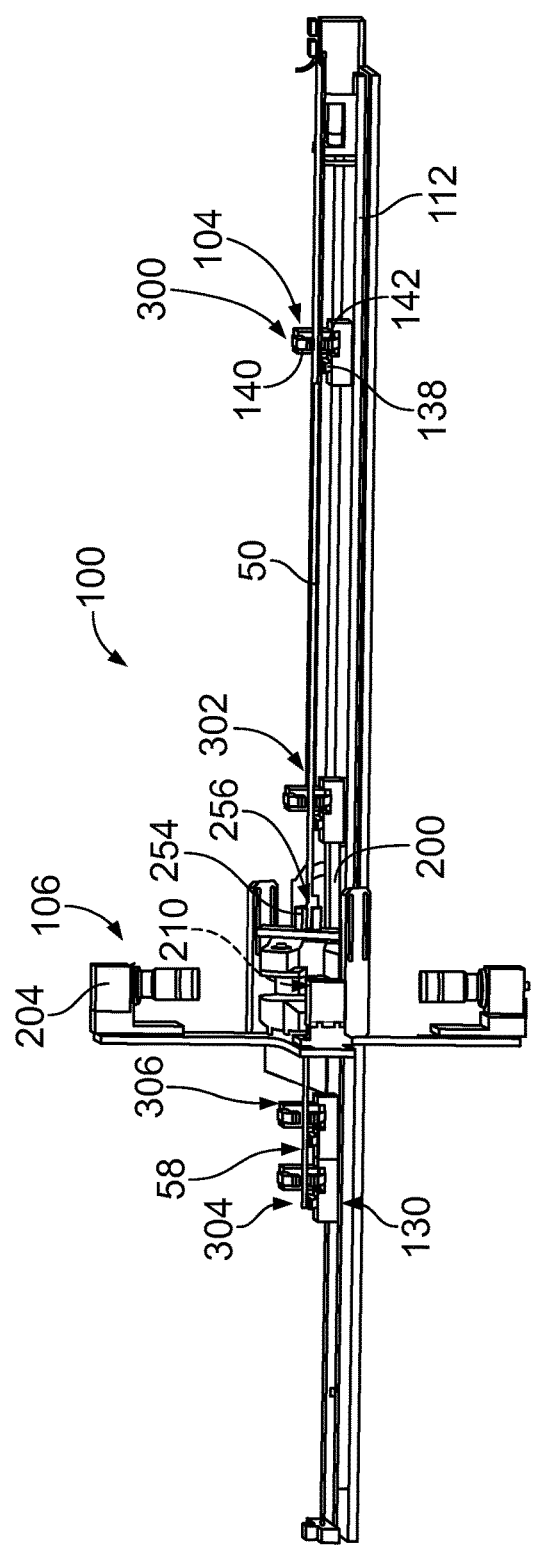
FIG. 8 is a side view of the inspection system in accordance with an exemplary embodiment showing the vision system in the second position after the product holder assembly is activated to change the product grippers that are holding the elongated product.

FIG. 7 is a front perspective view of the inspection system 100 in accordance with an exemplary embodiment showing the vision system 106 in a second position. FIG. 8 is a side view of the inspection system 100 in accordance with an exemplary embodiment showing the vision system 106 in the second position after the product holder assembly 104 is activated to change the product grippers 130 that are holding the elongated product 50.

As the carrier 200 moves along the rail 112 from the first position (FIG. 5) to the second position (FIG. 7), the elongated product 50 (for example, the second end portion 58) passes through the central bore 256 of the funnel 254 into the imaging zone 210. The vision system 106 images the elongated product 50 as the elongated product 50 passes through the imaging zone 210. The vision system 106 images 360° around the elongated product 50 using the multiple cameras 204.

As the carrier 200 moves along the rail 112, the first and second rearward product grippers 304, 306 are carried by the carrier 200 from the first position to the second position. In various embodiments, the carrier 200 may engage the second front product gripper 302 in the second position. In the second position, the first rearward product gripper 304 and the second rearward product grippers 306 are aligned with the second end portion 58 of the elongated product 50. The product supports 138 of the first rearward product gripper 304 and the second rearward product gripper 306 support the second end portion 58 of the elongated product 50. The jaws 140, 142 of the first rearward product gripper 304 and the second rearward product gripper 306 are in the open position to allow the elongated product 50 to pass therethrough as the vision system 106 is moved from the first position to the second position.

In an exemplary embodiment, the vision system 106 stops at the second position. The product holder assembly 104 is operated to change the product grippers 130 that hold the elongated product 50 (FIG. 8). For example, the second forward product gripper 302 is moved from the closed position to the open position and the first rearward product gripper 304 is moved from the open position to the closed position. As such, the first forward product gripper 300 and the first rearward product gripper 304 are in the closed positions to hold the elongated product 50, whereas the second forward product gripper 302 and the second rearward product gripper 306 are in the open positions to move relative to the elongated product. When the elongated product 50 is securely held in the inspection system 100, the vision system 106 may begin moving again in a forward direction along the elongated product 50. The first forward product gripper 300 and the first rearward product gripper 304 remain stationary as the vision system 106 begins moving in the forward direction. The second forward product gripper 302 is configured to be pushed forward by the carrier 200 and the second rearward product gripper 306 is configured to be pulled forward by the carrier 200 as the vision system 106 moves forward from the second position.

FIG. 9 is a side view of the inspection system 100 in accordance with an exemplary embodiment showing the vision system 106 in a third position. FIG. 10 is a side view of the inspection system 100 in accordance with an exemplary embodiment showing the vision system 106 in the third position after the product holder assembly 104 is activated to change the product grippers 130 that are holding the elongated product 50.

As the carrier 200 moves along the rail 112 from the second position (FIG. 7) to the third position (FIG. 9), the elongated product 50 (for example, the middle portion 60) passes through the imaging zone 210. The vision system 106 images the elongated product 50 as the elongated product 50 passes through the imaging zone 210.

As the carrier 200 moves along the rail 112, the second forward product gripper 302 is pushed forward by the carrier 200 and the second rearward product gripper 306 is pulled forward by the carrier 200 as the vision system 106 moves from the second position to the third position. In various embodiments, the carrier 200 may move the second front product gripper 302 adjacent to the first front product gripper 300 in the third position. The carrier 200 moves the second rear product gripper 306 to a spaced apart position relative to the first rearward product gripper 304. The second rear product gripper 306 may be located at the middle portion 60 of the elongated product 50 in the third position.

In an exemplary embodiment, the vision system 106 stops at the third position. The product holder assembly 104 is operated to change the product grippers 130 that hold the elongated product 50 (FIG. 10). For example, the first forward product gripper 300 is moved from the closed position to the open position and the second rearward product gripper 306 is moved from the open position to the closed position. As such, the first and second rearward product grippers 304, 306 are in the closed positions to hold the elongated product 50, whereas the first and second forward product grippers 300, 302 are in the open positions to move relative to the elongated product. When the elongated product 50 is securely held in the inspection system 100, the vision system 106 may begin moving again in a forward direction along the elongated product 50 to image the first end portion 56 of the elongated product 50. The first and second rearward product grippers 304, 306 remain stationary as the vision system 106 begins moving in the forward direction. The first and second forward product grippers 300, 302 are configured to be pushed forward by the carrier 200 as the vision system 106 moves forward from the third position.

Figure 11:
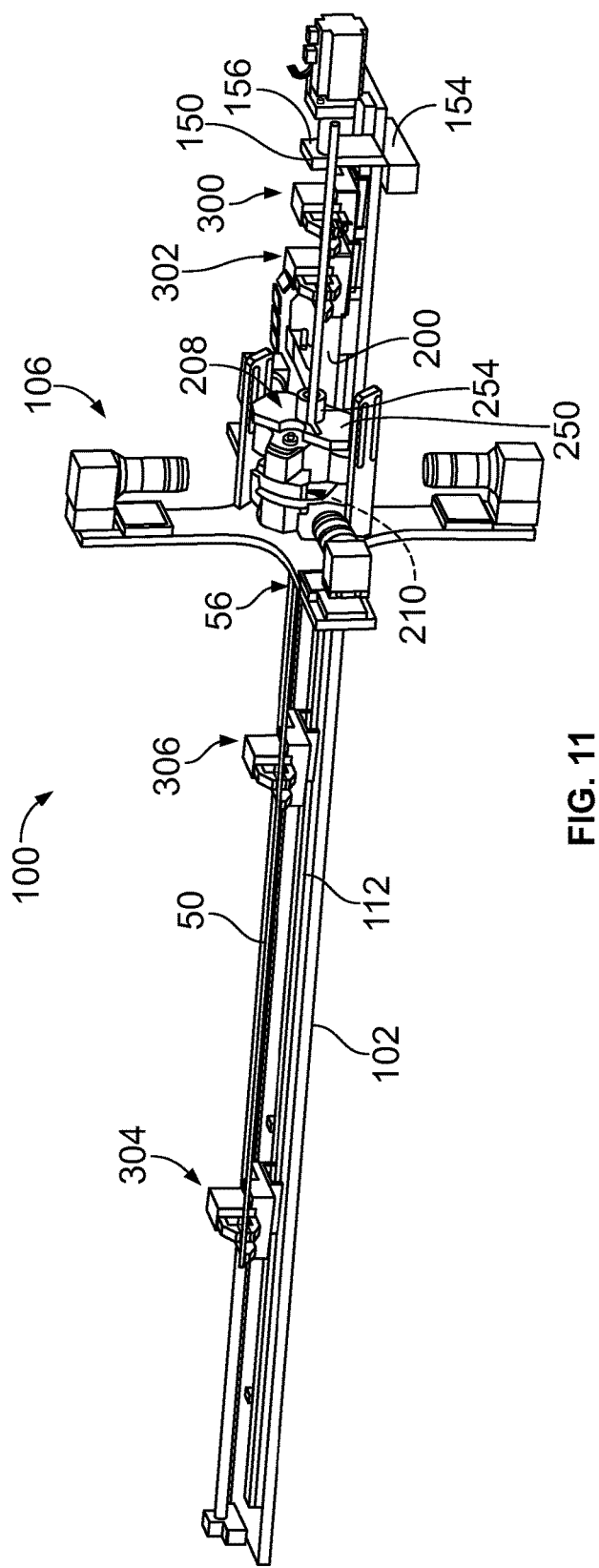
FIG. 11 is a front perspective view of the inspection system in accordance with an exemplary embodiment showing the vision system in a fourth position.
Figure 13:
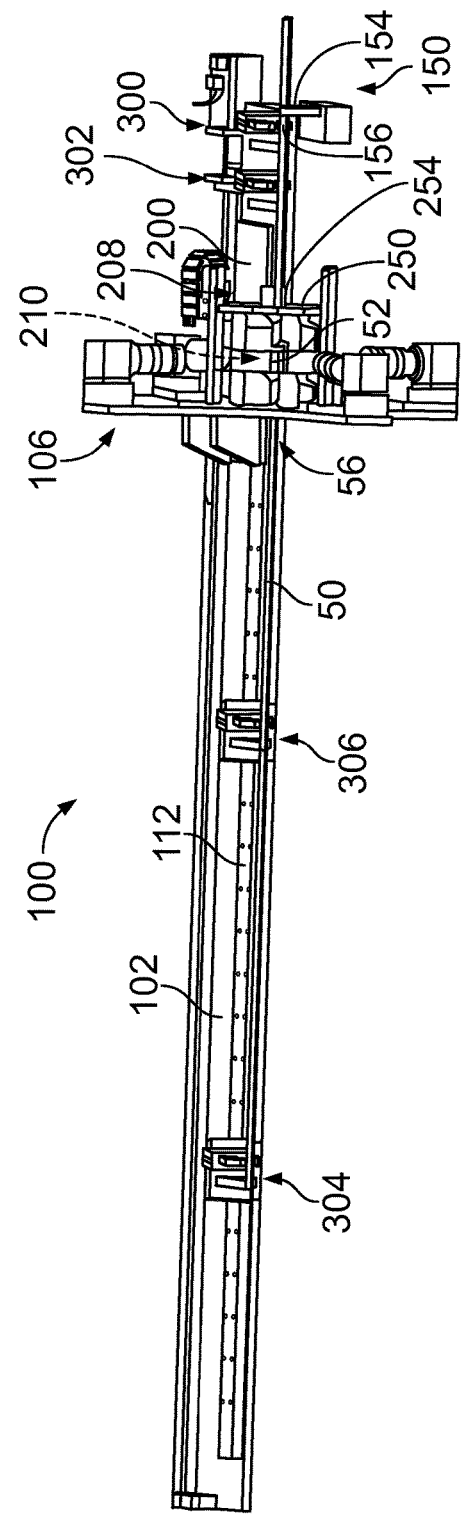
FIG. 13 is a side view of the inspection system in accordance with an exemplary embodiment showing the vision system in a fifth position.
Figure 12:
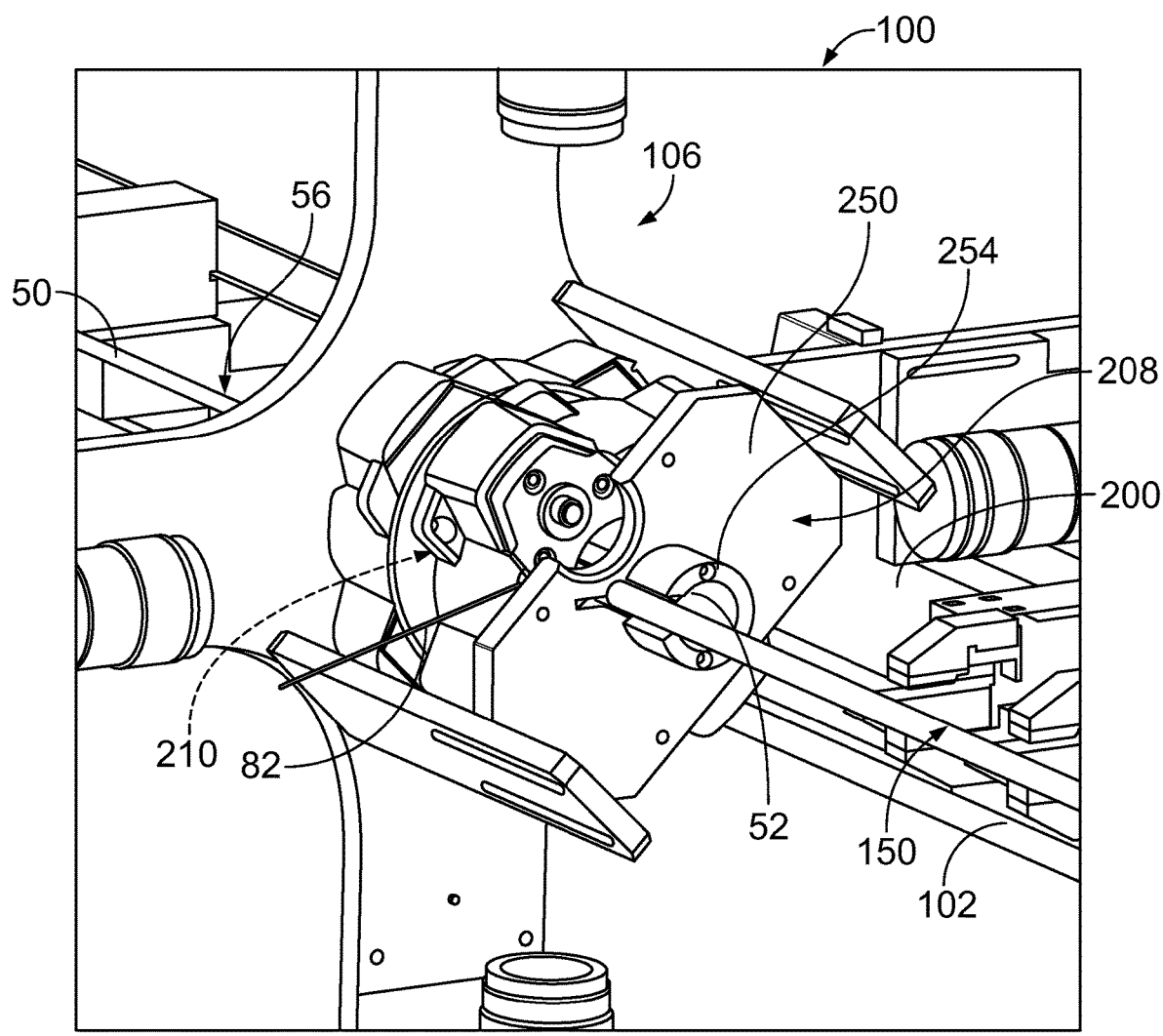
FIG. 12 is an enlarged, front perspective view of a portion of the inspection system in accordance with an exemplary embodiment showing the vision system in a fourth position.

FIG. 11 is a front perspective view of the inspection system 100 in accordance with an exemplary embodiment showing the vision system 106 in a fourth position. FIG. 12 is an enlarged, front perspective view of a portion of the inspection system 100 in accordance with an exemplary embodiment showing the vision system 106 in a fourth position. FIG. 13 is a side view of the inspection system 100 in accordance with an exemplary embodiment showing the vision system 106 in a fifth position.

As the carrier 200 moves along the rail 112 from the third position (FIG. 9) to the fourth position (FIG. 11), the elongated product 50 (for example, the first end portion 56) passes through the imaging zone 210. The vision system 106 images the elongated product 50 as the elongated product 50 passes through the imaging zone 210.

As the carrier 200 moves along the rail 112, the first and second forward product grippers 300, 302 are pushed to the forward end of the rail 112 by the carrier 200. The carrier 200 separates from the second rearward product gripper 306, which remains fixed relative to the platform 102 as the vision system 106 moves forward from the third position to the fourth position. The vision system 106 approaches the first end 52 of the elongated product 50 and the guide wire holder 150 as the vision system 106 moves to the fourth position. In an exemplary embodiment, the product guide 208 engages the guide wire holder 150 at the fourth position. For example, the funnel 254 and/or the central plate 250 may engage the guide wire holder 150 at the fourth position. In an exemplary embodiment, the guide wire holder 150 is movable relative to the platform 102. Forward movement of the vision system 106 from the fourth position to the fifth position moves the guide wire holder 150 in a forward direction. The spring 156 allows the guide wire holder 150 to move forward relative to the mounting bracket 154. The guide wire holder 150 moves the guide wire 82 out of the imaging zone 210 when the guide wire holder 150 moves forward with the vision system 106 from the fourth position to the fifth position. As such, the vision system 106 is able to image the first end 52 of the elongated product 50 without interference by the guide wire 82. For example, the guide wire 82 does not block any portion of the elongated product 50 in the imaging zone 210.

Figure 14:
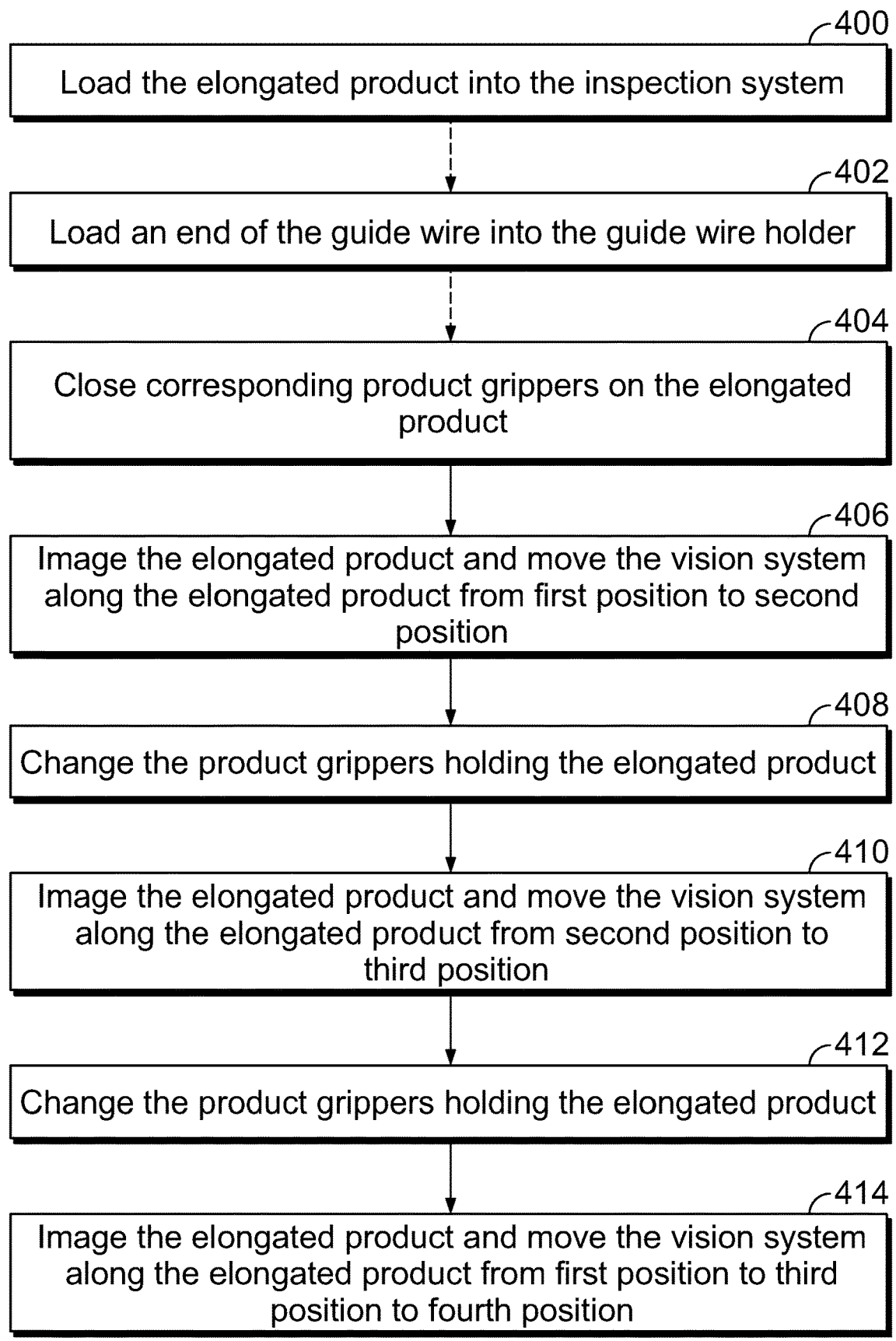
FIG. 14 is a flowchart of a method of inspecting elongated product in accordance with an exemplary embodiment.

FIG. 14 is a flowchart of a method of inspecting elongated product in accordance with an exemplary embodiment. At 400, the method includes loading the elongated product into the inspection system. The elongated product may be positioned in the product supports of the product grippers and/or in the funnel of the product guide to position the elongated product relative to the vision system. At 402, the method optionally includes loading an end of the guide wire into a guide wire holder.

At 404, the method includes operating the product holder assembly to close the corresponding product grippers. For example, the forward product grippers may be closed to clamp and retain the elongated product relative to the vision system.

At 406, the method includes operating the vision system to image the elongated product and move the vision system along the elongated product from a first position to a second position. The vision system uses multiple cameras two image the elongated product from different sides four 360° imaging of the elongated product. The carrier of the vision system may move the rearward product grippers with the carrier as the carrier slides along the rail of the platform to the second position.

At 408, the method includes operating the product holder assembly to change the product grippers holding the elongated product. For example, at least one product gripper forward of the vision system and at least one product gripper rearward of the vision system may be closed to hold the elongated product 50 on both sides of the vision system. At 410, the method includes operating the vision system to image the elongated product and move the vision system along the elongated product from the second position to a third position. The carrier of the vision system may move the corresponding product grippers with the carrier as the carrier slides along the rail of the platform to the third position.

At 412, the method includes operating the product holder assembly to change the product grippers holding the elongated product. For example, different combinations of the product grippers forwarded rearward of the vision system may be closed to hold the elongated product. At 414, the method includes operating the vision system to image the elongated product and move the vision system along the elongated product from the third position to a fourth position and the opposite ends of the elongated product as such, the entire elongated product is imaged by moving the vision system along the entire elongated product. Different combinations of the product grippers hold the elongated product during the various imaging processes as the vision system moves from one end of the elongated product to the other end of the elongated product.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments and are by no means limiting; they are merely exemplary embodiments. Many other embodiments and modifications within the spirit and scope of the claims will be apparent to those of skill in the art upon reviewing the above description. The scope of the invention should be determined with reference to the appended claims along with the full scope of equivalents to which such claims are entitled. In the appended claims, the terms "including" and "in which" are used as the plain-English equivalents of the respective terms "comprising" and "wherein." In the following claims, the terms "first," "second," and "third," etc. are used merely as labels and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An inspection system for inspecting a linear, elongated product comprising:
    a platform having a rail extending along an axis parallel to the elongated product;
    a product holder assembly for holding the elongated product, the product holder including a plurality of product grippers, each product gripper movable between an open position and a closed position, the product gripper configured to hold the elongated product in the closed position;
    a vision system for inspecting the product, the vision system including a carrier coupled to the rail and movable along the rail, the vision system including a camera support coupled to the carrier and movable along the rail with the carrier, the vision system including a plurality of cameras coupled to the camera support, the plurality of cameras configured to image the elongated product from different angles;
    wherein the cameras move along an entire length of the elongated product to image the entire elongated product between a first end and a second end of the elongated product; and
    wherein different combinations of the product grippers hold the elongated product as the vision system moves along the length of the elongated product.

2. The inspection system of claim 1, wherein at least one of the product grippers are slidable along the rail.

3. The inspection system of claim 2, wherein the at least one product gripper slidable along the rail is movable with the carrier.

4. The inspection system of claim 1, wherein the product grippers are movable relative to the elongated product when the product grippers are in the open position.

5. The inspection system of claim 1, wherein the product grippers include at least one forward product gripper forward of the vision system and at least one rearward product gripper rearward of the vision system.

6. The inspection system of claim 5, wherein the at least one forward product gripper includes a plurality of the forward product grippers and the at least one rearward product gripper includes a plurality of the rearward product grippers, the forward product grippers being independently movable between the open and closed positions, the rearward product grippers being independently movable between the open and closed positions.

7. The inspection system of claim 1, wherein the vision system is movable between a first position, a second position, and a third position, the vision system imaging a first end of the elongated product at the first position, the vision system imaging a middle portion of the elongated product in the second position, the vision system imaging a second end of the elongated product in the third position, wherein different combinations of the product grippers hold the elongated product in each of the first position, the second position, and the third position.

8. The inspection system of claim 7, wherein the vision system performs a first imaging process to image the elongated product between the first end and the middle portion, a second imaging process to image the middle portion, and a third imaging process to image between the middle portion and the second end, the vision system stopping between the first and second imaging processes to change the product grippers holding the elongated product, the vision system stopping between the second and third imaging processes to change the product grippers holding the elongated product.

9. The inspection system of claim 8, wherein the plurality of product grippers includes a first forward product gripper and a second forward product gripper forward of the vision system and a first rearward product gripper and a second rearward product gripper rearward of the vision system, the first and second forward product grippers operated in the closed position during the first imaging process, the first and second rearward product grippers operated in the closed position during the third imaging process, the first forward product gripper and the second rearward product gripper operated in the closed position during the second imaging process.

10. The inspection system of claim 1, wherein the cameras provide 360° imaging of the elongated product.

11. The inspection system of claim 1, further comprising a feeder assembly coupled to the carrier, the feeder assembly moving the carrier along the rail.

12. The inspection system of claim 11, wherein the feeder assembly includes an actuator and a shaft operably coupled to the actuator, the shaft being threadably coupled to the carrier, the actuator rotating the shaft to move the carrier along the rail.

13. The inspection system of claim 1, wherein the vision system further comprises a ring light surrounding the elongated product to illuminate the elongated product for 360° around the elongated product.

14. The inspection system of claim 1, wherein the vision system includes a product guide guiding the vision system along the elongated product, the product guide including a funnel having a central bore receiving the elongated product, the cameras surrounding the central bore to image the elongated product.

15. An inspection system for inspecting a linear, elongated product comprising:
a platform having a rail extending along an axis parallel to the elongated product;
a product holder assembly for holding the elongated product, the product holder including a plurality of product grippers, each product gripper movable between an open position and a closed position, the product gripper configured to hold the elongated product in the closed position;
a vision system for inspecting the product, the vision system including a carrier coupled to the rail and movable along the rail, the vision system including a camera support coupled to the carrier and movable along the rail with the carrier, the vision system including a plurality of cameras coupled to the camera support, the plurality of cameras configured to image the elongated product from different angles;
wherein the vision system is movable between a first position, a second position, and a third position, the vision system imaging a first end of the elongated product at the first position, the vision system imaging a middle portion of the elongated product in the second position, the vision system imaging a second end of the elongated product in the third position; and
wherein different combinations of the product grippers hold the elongated product in each of the first position, the second position, and the third position.

16. The inspection system of claim 15, wherein the vision system performs a first imaging process to image the elongated product between the first end and the middle portion, a second imaging process to image the middle portion, and a third imaging process to image between the middle portion and the second end, the vision system stopping between the first and second imaging processes to change the product grippers holding the elongated product, the vision system stopping between the second and third imaging processes to change the product grippers holding the elongated product.

17. The inspection system of claim 16, wherein the plurality of product grippers includes a first forward product gripper and a second forward product gripper forward of the vision system and a first rearward product gripper and a second rearward product gripper rearward of the vision system, the first and second forward product grippers operated in the closed position during the first imaging process, the first and second rearward product grippers operated in the closed position during the third imaging process, the first forward product gripper and the second rearward product gripper operated in the closed position during the second imaging process.

18. A method of inspecting elongated parts, the method comprising:
holding the elongated product using product grippers of a product holder assembly, wherein each product gripper is movable between an open position and a closed position, the product gripper being configured to hold the elongated product in the closed position;
imaging the elongated product using a plurality of cameras of a vision system, the plurality of cameras configured to image the elongated product from different angles;
moving the plurality of cameras along the elongated product to image an entire length of the elongated product between a first end and a second end of the elongated product, wherein different combinations of the product grippers hold the elongated product as the vision system moves along the length of the elongated product; and
processing the images to identify defects in the elongated product.

19. The method of claim 18, further comprising moving the product grippers relative to the elongated product when the product grippers are in the open positions to change gripping locations of the product grippers on the elongated product.

20. The method of claim 18, wherein said moving the plurality of cameras includes moving the vision system between a first position, a second position, and a third position, said imaging the elongated product includes imaging a first end of the elongated product at the first position, imaging a middle portion of the elongated product in the second position, and imaging a second end of the elongated product in the third position, wherein different combinations of the product grippers hold the elongated product in each of the first position, the second position, and the third position.

* * * * *